(12) United States Patent
Roh (10) Patent No.: US 7,646,456 B2
(45) Date of Patent: Jan. 12, 2010

(54) LIQUID CRYSTAL DISPLAY DEVICE

(75) Inventor: Su Dong Roh, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 314 days.

(21) Appl. No.: 11/798,914

(22) Filed: May 17, 2007

(65) Prior Publication Data

US 2008/0002111 A1    Jan. 3, 2008

(30) Foreign Application Priority Data

Jun. 29, 2006   (KR) ................... 10-2006-0059332

(51) Int. Cl.
*G02F 1/1335*    (2006.01)
*G02F 1/13363*    (2006.01)

(52) U.S. Cl. ................... 349/117; 349/106; 349/107

(58) Field of Classification Search .............. None
See application file for complete search history.

(56) References Cited

U.S. PATENT DOCUMENTS 6,342,970 B1 * 1/2002 Sperger et al. ............ 359/587

7,379,141 B2 * 5/2008 Moriya ..................... 349/119
2005/0142464 A1 * 6/2005 Moriya ..................... 430/7
2007/0002234 A1 * 1/2007 Nam et al. ................. 349/122

FOREIGN PATENT DOCUMENTS

CN    1650222    8/2005
CN    1777834    5/2006

* cited by examiner

Primary Examiner—Michelle R Connelly Cushwa
(74) Attorney, Agent, or Firm—McKenna Long & Aldridge LLP (57) ABSTRACT

Disclosed is a liquid crystal display device having an improved display quality. The device includes a substrate; black matrix formed in a matrix pattern on one side of the substrate, wherein the black matrix divides the substrate into a plurality of cell areas; a color filter layer having a red color filter of a first thickness formed in one of the plurality of cell areas, a green color filter of a second thickness which is higher than the first thickness, and a blue color filter of a third thickness which is higher than the second thickness; and a first compensation layer formed by coating the color filter layer and the black matrix with a polymerizable liquid crystal, wherein the first compensation layer is hardened, thereby leveling the substrate, and includes a positive C-plate; and a second compensation layer on another side of the substrate, wherein the second compensation layer is made of one of an A-plate and a biaxial film.

16 Claims, 7 Drawing Sheets

LIQUID CRYSTAL DISPLAY DEVICE

This application claims the benefit of the Korean Patent Application No. P2006-0059332 filed on Jun. 29, 2006 which is hereby incorporated by reference for all purposes as if fully set forth herein.

BACKGROUND OF THE INVENTION

1. Field of the Invention

The present invention relates to a liquid crystal display device, and more particularly to a liquid crystal display device that is adaptive for improving display quality.

2. Discussion of the Related Art

A liquid crystal display device controls the light transmittance of a liquid crystal by use of an electric field, thereby displaying a picture.

Figure 1:
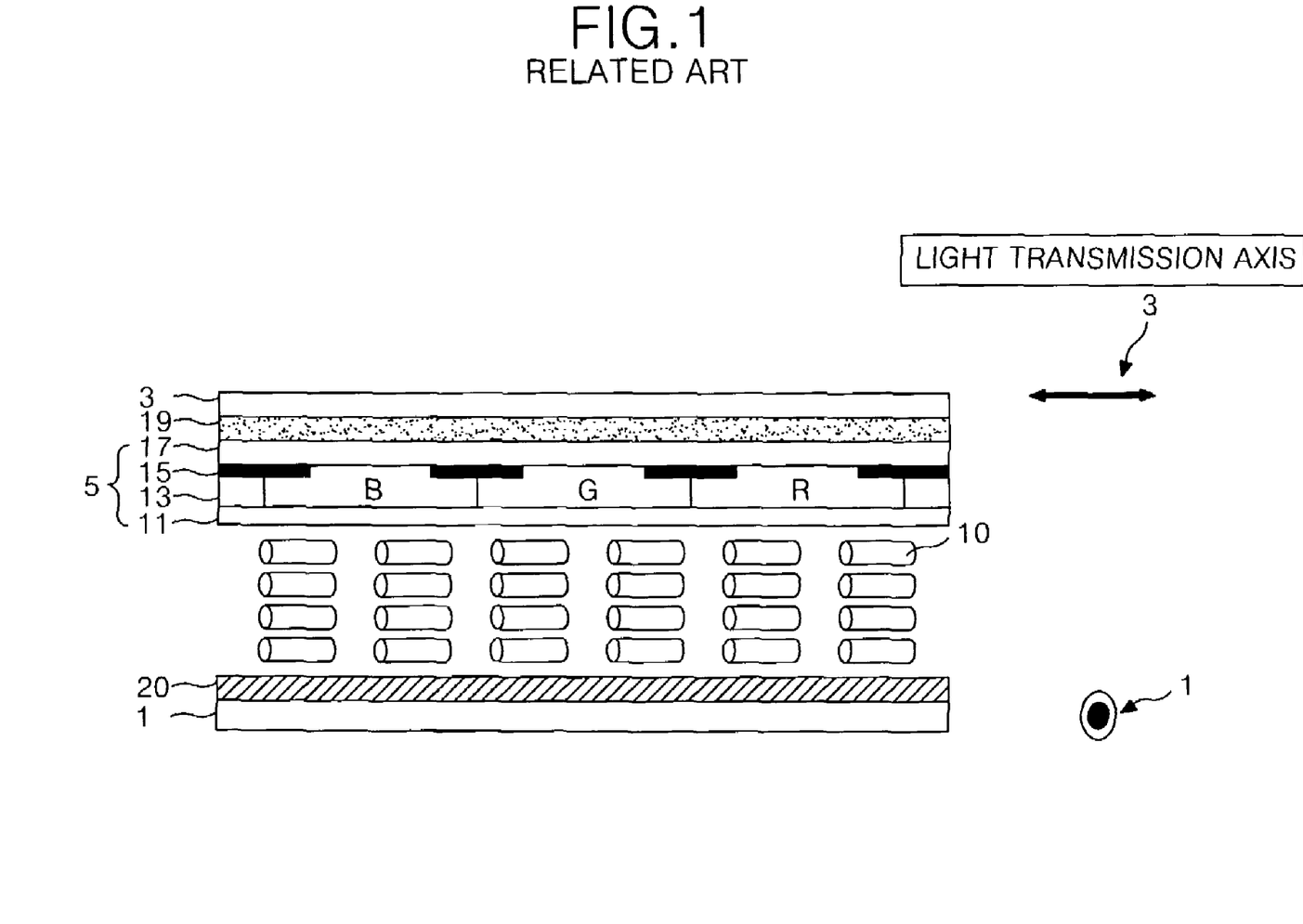
FIG. 1 is a diagram representing an example of a liquid crystal display device of the related art.

FIG. 1 is a diagram illustrating a liquid crystal display device of the related art. In FIG. 1, a detailed illustration of a thin film transistor panel 20 is omitted.

In FIG. 1, a liquid crystal display device of the related art includes a thin film transistor panel 20 and a color filter panel 5 which face each other and are bonded together; and liquid crystal molecules 10 filled in a liquid crystal space provided between the two panels 20, 5.

A lower polarizer 1 and an upper polarizer 3 are attached to the outer surfaces of the color filter panel 5 and the thin film transistor panel 20, respectively.

Generally, optical transmission axes of the lower polarizer 1 and upper polarizer 3 of the liquid crystal display device perpendicularly cross each other, and the lower polarizer 1 and the upper polarizer 3 only transmit the lights which are parallel to their own optical transmission axes, respectively.

Although not illustrated, the thin film transistor panel 20 includes gate lines formed on a lower substrate; and data lines which cross the gate lines to define pixel areas. And, in the pixel area are formed a thin film transistor which is a switching device; a pixel electrode connected to the thin film transistor; and a common electrode to form an electric field with the pixel electrode.

If the electric field is formed between the pixel electrode and the common electrode, the liquid crystal molecules 10 arranged between the thin film transistor panel 20 and the color filter panel 5 rotate by dielectric anisotropy. The transmittance of the light transmitted through the pixel area is changed in accordance with the degree of rotation of the liquid crystal molecules 10, thereby realizing the picture.

The color filter panel 5 includes a substrate 17; and a black matrix 15 and a color filter layer 13 which are sequentially formed on the substrate 17.

The black matrix 15 is formed in a matrix pattern on the substrate 17. The black matrix 15 divides the area of the substrate 17 into a plurality of cell areas and prevents optical interference between adjacent cells and external light reflection. The color filter layer 13 is formed to include red, green and blue color filters R, G, B which are formed in the cell area divided by the black matrix 15. The red, green and blue color filters R, G, B transmit red, green and blue lights respectively.

The liquid crystal molecules 10 formed in the liquid crystal display device have refractive index anisotropy and have a distribution state that changes based upon viewing angle directions. Thus, the light transmitted through the liquid crystal molecules 10 has a phase delay value different for each viewing angle direction. If the phase delay value is different in accordance with the viewing angle, brightness and contrast ratio become different for each viewing angle direction, thereby deteriorating the display quality of the liquid crystal display device.

In order to improve the deterioration of brightness and contrast ratio caused by the distribution state of the liquid crystal molecules 10 in accordance with the viewing angle direction, the related art includes first and second compensation layers 11, 19 which compensate the phase delay difference in accordance with the viewing angle.

The first compensation layer 11 is formed to cover the color filter layer 13, and the second compensation layer 19 is formed between the color filter panel 5 and the upper polarizer 3. The first compensation layer 11 is made by hardening a polymerizable liquid crystal, and the second compensation layer 19 is mainly made by drawing a polymer film.

On the other hand, light has dispersion characteristic that light is refracted differently for each wavelength range when being transmitted through a medium. In other words, when the light is transmitted through the medium, the light has a different phase delay value for each wavelength range. Accordingly, the red, green and blue lights transmitted through the lower polarizer 1, the liquid crystal 10, the first compensation layer 11, the color filter layer 13, the second compensation layer 19, the upper polarizer 3 and the like are phase-delayed to have different values from each other, thus a desired color is not displayed in the liquid crystal display device and the display quality of the liquid crystal display is deteriorated. Particularly, the phase delay difference is high by wavelength ranges after the light incident from a light source is transmitted through the first compensation layer 11 being made of polymerizable liquid crystal. This is because the dispersion characteristic of the liquid crystal is basically high.

Figure 2:
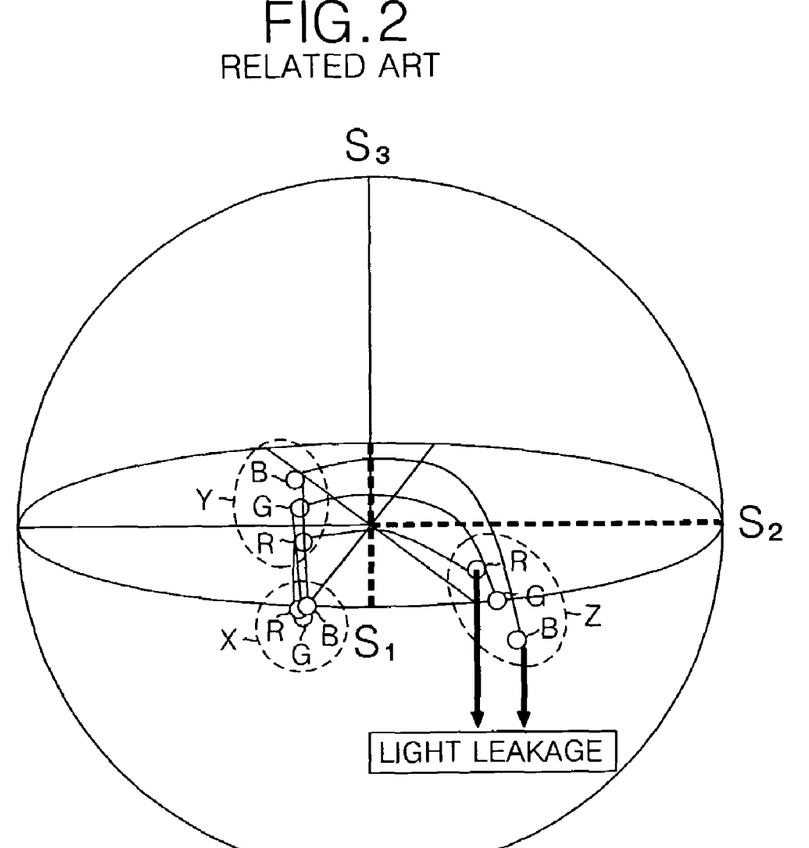
FIG. 2 is a diagram representing phases of red, green and blue lights on a Poincare sphere.

FIG. 2 illustrates phases of red, green and blue lights on a Poincare sphere.

In conjunction with FIG. 2, to describe the phase delay of the red, green and blue lights more specifically, the red, green, blue lights having the same phase as shown in area 'X' when being initially incident from the light source are phase-delayed to have different values from each other as the lights are transmitted through the first compensation layer 11, thereby having different phases as shown in area 'Y'. At this moment, the reason why the phase delay values of the red, green and blue light are different is because light has a different phase delay value $\Gamma$ in accordance with a wavelength $\lambda$.

$$\Gamma = 2\pi d \Delta n / \lambda \qquad \text{[Mathematical Formula 1]}$$

($\Gamma$: phase delay, d: thickness of medium, $\Delta n$: refractive index of medium, $\lambda$: wavelength)

As shown in Mathematic Formula 1, the phase delay value is lower as the wavelength $\lambda$ is higher, and the phase delay value is higher as the wavelength $\lambda$ is lower. The wavelengths $\lambda$ of red R, green G and blue B are 650 nm, 550 nm and 450 nm respectively, thus the red light with the long wavelength $\lambda$ has the lowest phase delay value among the red, green and blue, and the blue light with the short wavelength $\lambda$ has the highest phase delay value among the red, green and blue, as shown in area 'Y' of FIG. 2.

The red, green and blue lights having phases as shown in area 'Y' are phase-delayed with the same principle as described above in Mathematical Formula 1 when being transmitted through the compensation layer 19 and the upper polarizer 3, thereby having more dispersed phases as shown in area 'Z'.

Further, the optical axis of the upper polarizer 3 of the related art is designed to be in accord with the optical axis of the green wavelength range, thus the red and blue lights having different phases from the green cannot be displayed correctly, thereby deteriorating the display quality of the liquid crystal display device. Hereinafter, the case of displaying a black state, i.e., the case that the optical axis of the light transmitted through the liquid crystal molecules 10 is perpendicular to the optical axis of the upper polarizer 3, is taken as an example to fully explain the display quality deterioration of the liquid crystal display device caused by the phase delay difference for each wavelength range.

When the liquid crystal display device is in a black state, the optical axis of the upper polarizer 3 designed in consideration of the wavelength of green when observing the liquid crystal display device in a viewing angle direction becomes perpendicular to the optical axis of green, thereby shutting off the green light. But, on the other hand, as described above, the red and blue lights having different phase delay values from the green light does not have their optical axes correctly perpendicular to the optical axis of the upper polarizer 3. The red and blue lights not being perpendicular to the upper polarizer 3 can leak out through the upper polarizer 3. If the red and blue light leak out, an unwanted color of purple made by mixing red and blue is displayed on a screen of the liquid crystal display device, thereby deteriorating the display quality of the liquid crystal display device.

SUMMARY OF THE INVENTION

Accordingly, the present invention is directed to a liquid crystal display device that substantially obviates one or more of the problems due to limitations and disadvantages of the related art.

An Advantage of the present invention to provide a liquid crystal display device that is adaptive for improving display quality.

Additional features and advantages of the invention will be set forth in the description which follows, and in part will be apparent from the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention as embodied and broadly described, a liquid crystal display device according to an aspect of the present invention includes a substrate; a black matrix formed in a matrix pattern on one side of the substrate, wherein the black matrix divides the substrate into a plurality of cell areas; a color filter layer having a red color filter of a first thickness formed in one of the plurality of cell areas, a green color filter of a second thickness which is higher than the first thickness, and a blue color filter of a third thickness which is higher than the second thickness; a first compensation layer formed by coating the color filter layer and the black matrix with a polymerizable liquid crystal, wherein the first compensation layer is hardened, thereby leveling the substrate, and includes a positive C-plate; and a second compensation layer on another side of the substrate, wherein the second compensation layer is made of one of an A-plate and a biaxial film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

Figure 3:
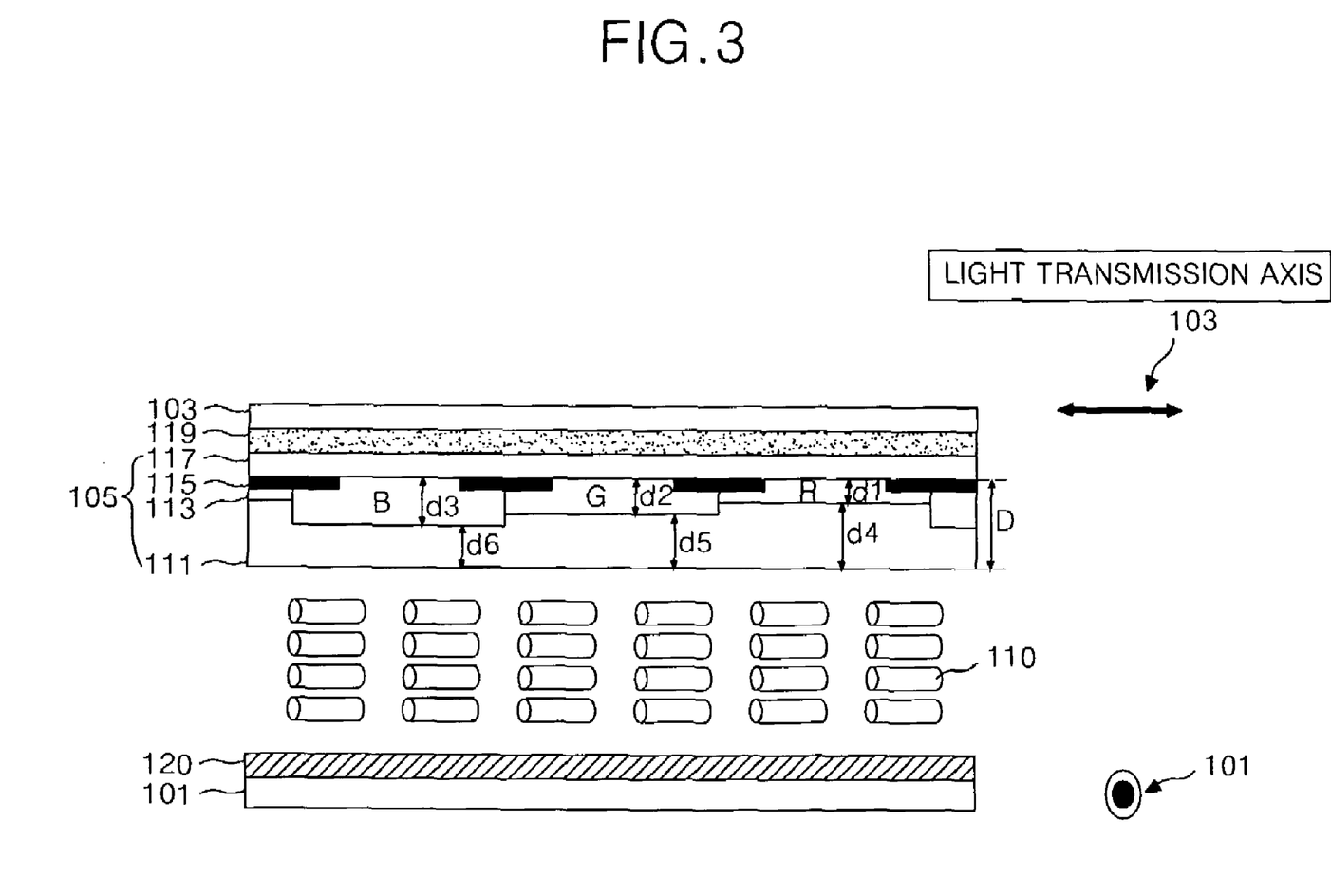
FIG. 3 is a diagram representing a liquid crystal display device according to the present invention.
Figure 4A:
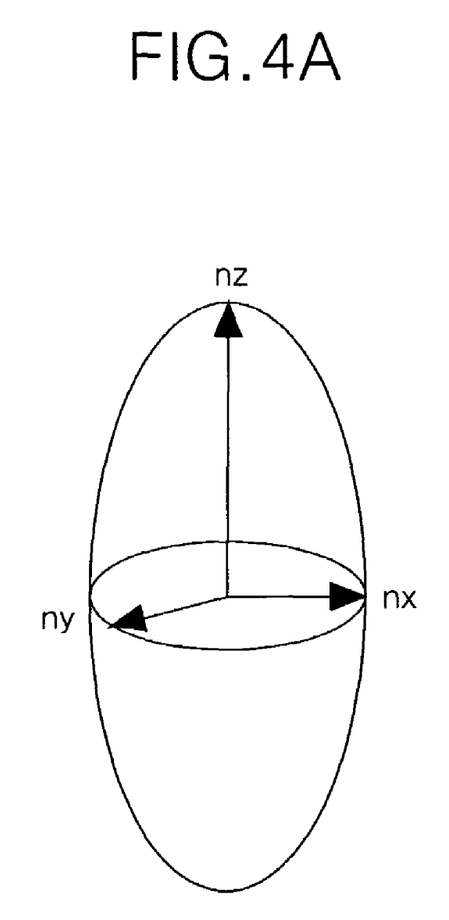
FIGS. 4A to 4C illustrate characteristic of first and second compensation layers.
Figure 4B:
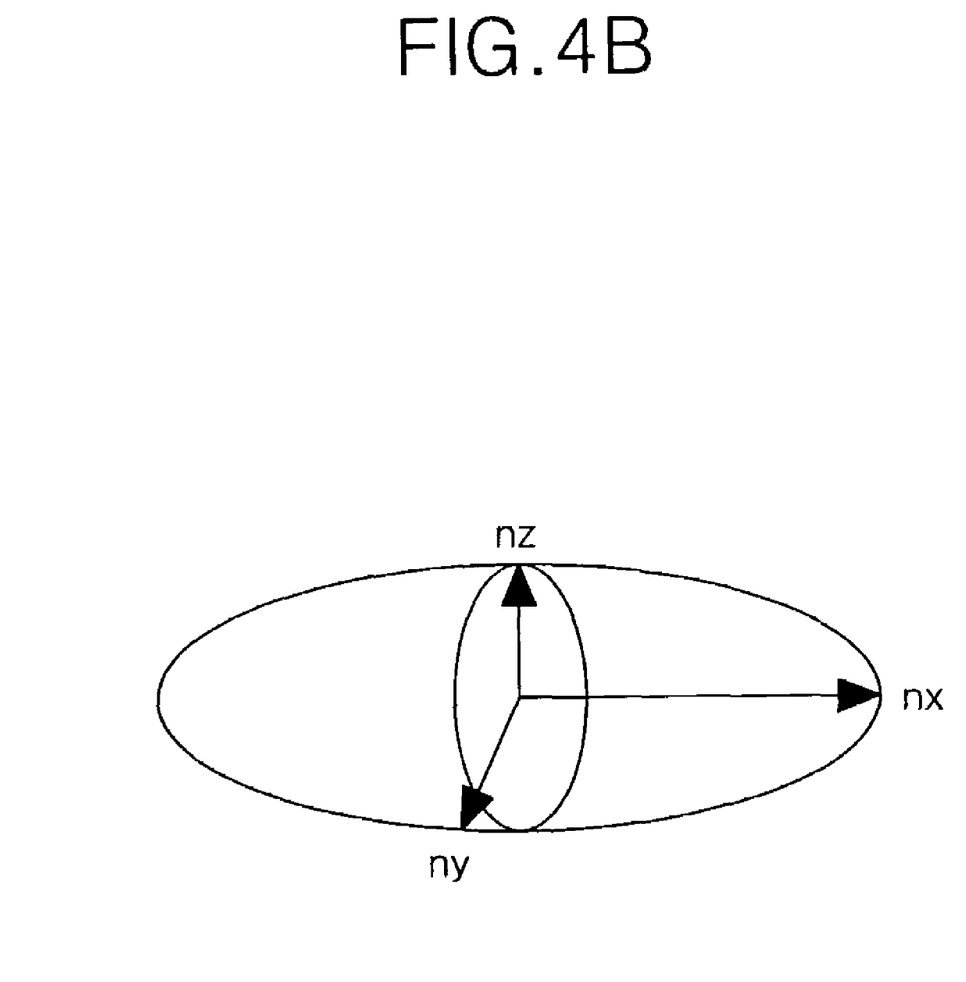
Figure 4C:
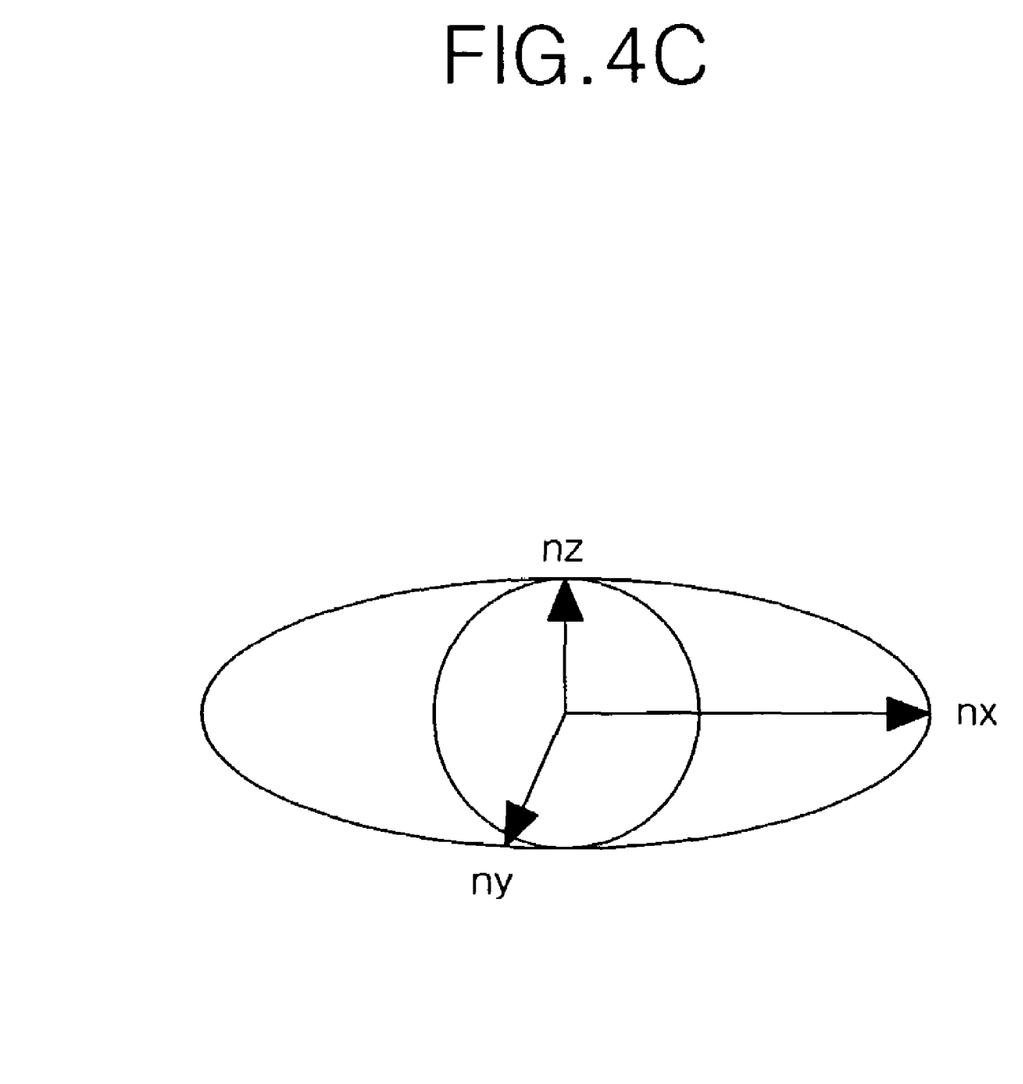
Figure 5:
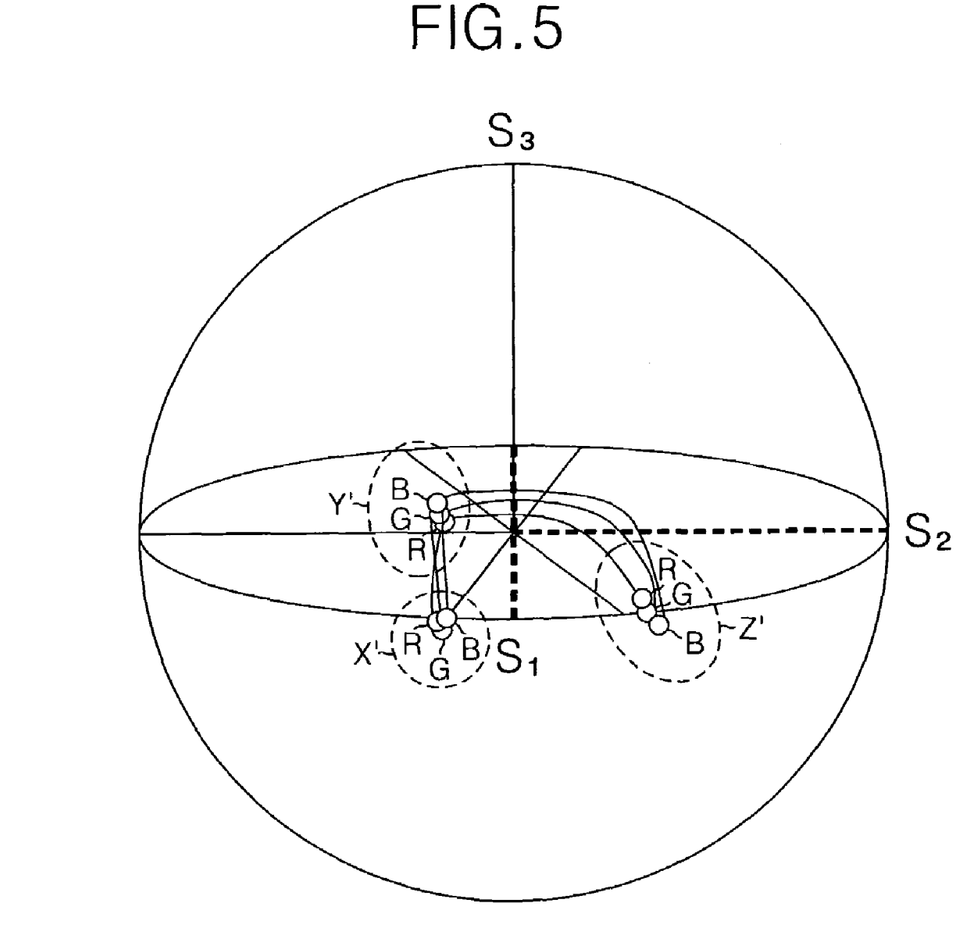
FIG. 5 is a diagram representing phases of red, green and blue lights on a Poincare sphere.

With reference to FIGS. 3 to 5, embodiments of the present invention will be explained as follows.

A liquid crystal display device controls the light transmittance of a liquid crystal in use of an electric field, thereby displaying a picture.

FIG. 3 is a diagram illustrating a liquid crystal display device according to the present invention. In FIG. 3, discussion of a thin film transistor panel 120 is omitted.

Referring to FIG. 3, a liquid crystal display device includes a thin film transistor panel 120 and a color filter panel 105 which face each other and are bonded together; and liquid crystal molecules 110 filled in a liquid crystal space provided between the two panels 120, 105.

And, a lower polarizer 101 and an upper polarizer 103 are attached to the outer surfaces of the color filter panel 105 and the thin film transistor panel 120 respectively.

Optical transmission axes of the lower polarizer 101 and upper polarizer 103 of the liquid crystal display device perpendicularly cross each other, and the lower polarizer 101 and the upper polarizer 103 only transmit the lights which are parallel to their own optical transmission axes, respectively.

The thin film transistor panel 120 includes gate lines formed on a substrate; and data lines which cross the gate lines to define pixel areas. And, in the pixel area are formed a thin film transistor connected to the gate line and the data line for acting as a switching device of a liquid crystal display device; a pixel electrode connected to the thin film transistor; and a common electrode to form an electric field with the pixel electrode. The common electrode is connected to a common line.

The common line is formed substantially parallel to the gate line with the pixel area therebetween. The common line supplies a reference voltage for driving the liquid crystal molecules 110 to the common electrode.

The thin film transistor supplies data signals from the data line to the pixel electrode in response to gate signals from the gate line. A horizontal electric field is formed between the pixel electrode to which the data signal is supplied through the thin film transistor and the common electrode to which the reference voltage is supplied through the common line. The liquid crystal molecules 110 arranged between the thin film transistor panel 120 and the color filter panel 105 by the horizontal electric field rotate by dielectric anisotropy. The transmittance of the light transmitted through the pixel area is changed in accordance with the degree of rotation of the liquid crystal molecules 110, thereby realizing the picture.

The color filter panel 105 includes a substrate 117; and a black matrix 115 and a color filter layer 113 which are sequentially formed on the substrate 117.

The black matrix 115 is formed in a matrix pattern on the substrate 117. The black matrix 115 divides the area of the substrate 117 into a plurality of cell areas and prevents optical interference between adjacent cells and external light reflection. The color filter layer 113 is formed to include red, green and blue color filters R, G, B which are formed in the cell area divided by the black matrix 115. The red, green and blue color filters R, G, B transmit red, green and blue lights respectively.

The liquid crystal molecules 110 formed in the liquid crystal display device have refractive index anisotropy and have a distribution state that changes based upon viewing angle directions. Thus, the light transmitted through the liquid crystal molecules 110 has a different phase delay value for each viewing angle direction.

In order to remove the phase delay difference caused by the difference of distribution state of the liquid crystal molecules 110 in accordance with the viewing angle direction, the liquid crystal display device according to the present invention includes first and second compensation layers 111, 119.

The first compensation layer 111 is formed by being coated with a polymerizable liquid crystal such as reactive mesogen and being hardened. The first compensation layer 111 is formed to cover the black matrix 115 and the color filter layer 113 and levels the substrate 117 where the black matrix 115 and the color filter 113 are formed. In other words, if the first compensation layer 111 is formed, the distance from the substrate 117 to the first compensation layer 117 is 'D'. Further, the first compensation layer 111 is formed of a liquid crystal material having refractive index anisotropy, thus the phase delay difference caused by the liquid crystal molecules 110 can be compensated in use of the refractive index anisotropy.

To the first compensation layer 111 is applied a positive C-plate which is made of a polymerizable liquid crystal having a vertical alignment characteristic and where the sizes of the refractive index of an X-axis direction nx, the refractive index of a Y-axis direction ny and the refractive index of a Z-axis direction nz are in a relationship of nx=ny<nz, as shown in FIG. 4a. (x, y are planar direction axes of the first compensation layer, and z is a thickness direction axis of the first compensation layer 111)

The liquid crystal display device according to the present invention further has the second compensation layer 119 between the color filter panel 105 and the upper polarizer 103 to compensate the phase delay difference caused by the liquid crystal molecules 110 together with the first compensation layer 111.

The second compensation layer 119 is processed by a drawing method of extending a polymer film of an isotropic material in a set direction to make the drawing ratio of the left and right parts of the polymer film different, thereby making the polymer film have refractive index anisotropy. By means of such refractive index anisotropy, the second compensation layer 119 can compensate the phase delay difference caused by the liquid crystal molecules 110 together with the first compensation layer 111.

To the second compensation layer 119 is applied an A-plate having a relationship of nx>ny=nz, as shown in FIG. 4B, or a biaxial film having a relationship of nx>ny>nz, as shown FIG. 4C.

The second compensation layer 119 can be formed of a liquid crystal type other than the polymer film processed by drawing. The second compensation layer 119 of the liquid crystal type is formed by being coated with a liquid crystal material having refractive anisotropy and being hardened.

The liquid crystal display device according to the above description can compensate the phase delay difference caused by the liquid crystal molecules 110 in combination of the first and second compensation layers 111, 119.

Further, the present invention has the first compensation layer 111 corresponding to each of the red, green and blue color filters R, G, B formed to be different in thickness in order to reduce a phenomenon that the light incident from the light source is dispersed as being transmitted through the first compensation layer 111. In order to differently form the thickness of the first compensation layer 111 corresponding to each of the red, green and blue color filters R, G, B, the red, green and blue color filters R, G, B according to the present invention are formed to have a first thickness d1, a second thickness d2 and a third thickness d3 which are different from each other. The first compensation layer 111 is formed to have fourth to sixth thicknesses d4, d5, d6 which are different from each other for each of the parts corresponding to the red, green and blue color filters R, G, B by means of being coated on the color filter layer 113 inclusive of the first to third thicknesses d1, d2, d3 to level the substrate 117.

As illustrated in FIG. 3, to describe the fourth to sixth thicknesses d4, d5, d6 of the first compensation layer 111 more specifically, the thickness of the first compensation layer 111 of the part being overlapped with the red color filter R is the fourth thickness d4 which is equal to the difference between the thickness D and the first thickness d1 of the red color filter, i.e., d4=D−d1. And, the thickness of the first compensation layer 111 being overlapped with the green color filter G is the fifth thickness d5 which is equal to the difference between the thickness D and the second thickness d2 of the green color filter, i.e., d5=D−d2. Further, the thickness of the first compensation layer 111 being overlapped with the blue color filter B is the sixth thickness d6 which is equal to the difference between the thickness D and the third thickness d3 of the blue color filter, i.e., d6=D−d3.

The fourth to sixth thicknesses d4, d5, d6 for reducing the dispersion effect of the light of red, green and blue wavelengths being transmitted through the first compensation layer 111 minimize the difference of the phase delay value $\Gamma_R$, $\Gamma_G$, $\Gamma_B$, for each wavelength range.

The phase delay value $\Gamma_R$, $\Gamma_G$, $\Gamma_B$ of the light of red, green and blue wavelength being transmitted through the first compensation layer 111 satisfies Mathematical Formulas 2 to 4, wherein Δn is a refractive index of the first compensation layer 111.

$\Gamma_R = 2\pi d4 \Delta n / 650$ nm [Mathematical Formula 2]

$\Gamma_G = 2\pi d5 \Delta n / 550$ nm [Mathematical Formula 3]

$\Gamma_B = 2\pi d6 \Delta n / 450$ nm [Mathematical Formula 4]

According to the foregoing Mathematical Formulas 2 to 4, d4:d5:d6 is 13:11:9 in order to minimize the difference of the phase delay value $\Gamma_R$, $\Gamma_G$, $\Gamma_B$ of red, green and blue wavelength transmitted through the first compensation layer 111. According to Mathematical Formulas 2 to 4, if the correlation of the fourth thickness to the sixth thickness d4, d5, d6 is arranged on the basis of the fifth thickness d5, then d4 is 1.18 d5 and d6 is 0.82d5, i.e., d4=1.18d5, d6=0.82d5. If the correlation of the fourth thickness to the sixth thickness d4, d5, d5 is rearranged in consideration of errors which might occur during the course of fabrication, then the fourth thickness d4 is desirably formed to be above about 1.1 times and below about 1.2 times the fifth thickness d5, and the sixth thickness d6 is desirably formed to be above about 0.7 times and below about 0.9 times the fifth thickness d5. That is to say, the relationship is the fourth thickness d4>the fifth thickness d5>the sixth thickness d6. Accordingly, the relationship of the first to third thicknesses d1, d2, d3 becomes the first thickness d1<the second thickness d2<the third thickness d3. In order to minimize the phase delay difference after the light of red, green and blue wavelengths is transmitted through the first compensation layer 111, the thickness of the red color filter R should be the lowest and the thickness of the blue color filter B should be the highest.

The result of measuring the optimal values of the fourth to sixth thicknesses d4, d5, d6 for minimizing the difference of the phase delay value $\Gamma_R$, $\Gamma_G$, $\Gamma_B$ of red, green and blue wavelength transmitted through the first compensation layer 111 is as follows.

The optimal range of the fourth thickness d4 is above about 1.60 μm and below about 1.70 μm. The optimal range of the fifth thickness d5 is above about 1.35 μm and below about 1.45 μm. The optimal range of the sixth thickness d6 is above about 1.10 μm and below about 1.20 μm. The stepped difference between the red color filter R and the green color filter G is above about 0.15 μm and below about 0.25 μm in accordance with the optimal value of the fourth to sixth thicknesses d4, d5, d6 measured like this. And, the stepped difference between the green color filter G and the blue color filter B is above about 0.25 μm and below about 0.35 μm. In consideration of the errors which might be generated during the course of fabrication, the stepped difference between the red color filter R and the green color filter G is desirably set above about 0.1 μm and below about 0.3 μm, and the stepped difference between the green color filter G and the blue color filter B is desirably set above about 0.2 μm and below about 0.4 μm.

FIG. 5 illustrates phases of red, green and blue lights on a Poincare sphere.

In conjunction with FIG. 5, to more specifically describe the phases of the red, green and blue lights which realize pixels of the liquid crystal display device, the red, green, blue lights having the same phases as shown in area 'X' when being initially incident from the light source have almost the same phases as displayed in area 'Y' as the lights are transmitted through the first compensation layer 111 of the fourth to sixth thicknesses d4, d5, d6 which are designed to minimize the difference of the phase delay value for each wavelength range. After then, the red, green, blue lights having the same phases as shown in area 'Y' have almost the same phases as displayed in area 'Z' as the lights are transmitted through the second compensation layer 119 and the upper polarizer 103, thereby making it possible to minimize the dispersion of the red, green and blue lights. The display quality of the liquid crystal display device is improved as the dispersion of the red, green and blue lights is minimized like this.

As described above, the liquid crystal display device according to the present invention makes the stepped difference between the red, green and blue color filters, thus the first compensation layer coated thereover also has the stepped difference, thereby reducing a phenomenon that the red, green and blue lights incident from the light source are dispersed for each of the red, green and blue wavelength ranges as being transmitted through the first compensation layer having the stepped difference.

The liquid crystal display device according to the present invention like this is improved in color characteristic as the phenomenon of being dispersed for each of the red, green and blue wavelength ranges is reduced, thereby improving the display quality.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a substrate;
    a black matrix formed in a matrix pattern on one side of the substrate, wherein the black matrix divides the substrate into a plurality of cell areas;
    a color filter layer having a red color filter of a first thickness formed in one of the plurality of cell areas, a green color filter of a second thickness which is higher than the first thickness, and a blue color filter of a third thickness which is higher than the second thickness; and
    a first compensation layer formed by coating the color filter layer and the black matrix with a polymerizable liquid crystal, wherein the first compensation layer is hardened, thereby leveling the substrate, and includes a positive C-plate; and
    a second compensation layer on another side of the substrate, wherein the second compensation layer is made of one of an A-plate and a biaxial film.

2. The liquid crystal display device according to claim 1, wherein a stepped difference between the red color filter and the green color filter is above 0.1 μm and below 0.3 μm, and a stepped difference between the green color filter and the blue color filter is above 0.2 μm and below 0.4 μm.

3. The liquid crystal display device according to claim 1, wherein the thickness of the first compensation layer corresponding to the red color filter is above about 1.1 times and below about 1.3 times the thickness of the first compensation layer corresponding to the green color filter.

4. The liquid crystal display device according to claim 1, wherein the thickness of the first compensation layer corresponding to the blue color filter is above 0.7 times and below 0.9 times the thickness of the first compensation layer corresponding to the green color filter.

5. The liquid crystal display device according to claim 1, wherein the thickness of the first compensation layer corresponding to the red color filter is above 1.60 μm and below 1.70 μm.

6. The liquid crystal display device according to claim 1, wherein the thickness of the first compensation layer corresponding to the green color filter is above about 1.35 μm and below 1.45 μm.

7. The liquid crystal display device according to claim 1, wherein the thickness of the first compensation layer corresponding to the blue color filter is above 1.10 μm and below 1.20 μm.

8. The liquid crystal display device according to claim 1, wherein an upper polarizer is provided on the second compensation layer.

9. A method of fabricating a liquid crystal display device, comprising:
    forming a substrate;

forming a black matrix pattern on one side of the substrate, wherein the black matrix is formed to divide the substrate into a plurality of areas, a green color filter of a second thickness which is higher;

forming a color filter layer having a red color filter of a first thickness formed in one of the plurality of cell area, a green color filter of a second thickness which is higher than the first thickness, and a blue color filter of a third thickness which is higher than the second thickness;

forming a first compensation layer formed by coating the color filter layer and the black matrix with a polymerizable liquid crystal, wherein the first compensation layer is hardened, thereby hardening the substrate, and includes a positive C-plate; and forming a second compensation layer on another side of the substrate, wherein the second compensation layer is made of one of an A-plate and a biaxial film.

10. The method according to claim 9, wherein a stepped difference formed between the red color filter and the green color filter is above 0.1 μm and below 0.3 μm, and a stepped difference between the green color filter and the blue color filter is above 0.2 μm and below 0.4 μm.

11. The method according to claim 9, wherein the thickness of the first compensation layer corresponding to the red color filter is above 1.1 times and below 1.3 times the thickness of the first compensation layer corresponding to the green color filter.

12. The method according to claim 9, wherein the thickness of the first compensation layer corresponding to the blue color filter is above 0.7 times and below 0.9 times the thickness of the first compensation layer corresponding to the green color filter layer.

13. The method according to claim 9, wherein the thickness of the first compensation layer corresponding to the red color filter is above 1.60 μm and below 1.70 μm.

14. The method according to claim 9, wherein the thickness of the first compensation layer corresponding to the green color filter is above 1.35 μm and below 1.45 μm.

15. The method according to claim 9, wherein the thickness of the first compensation layer corresponding to the blue color filter is above 1.10 μm and below 1.20 μm.

16. The method according to claim ,1 wherein an upper polarizer is formed on the second compensation layer.

* * * * *